Feb. 3, 1931.    C. TOWNER    1,791,472
SEPARABLE FASTENER
Filed July 24, 1928
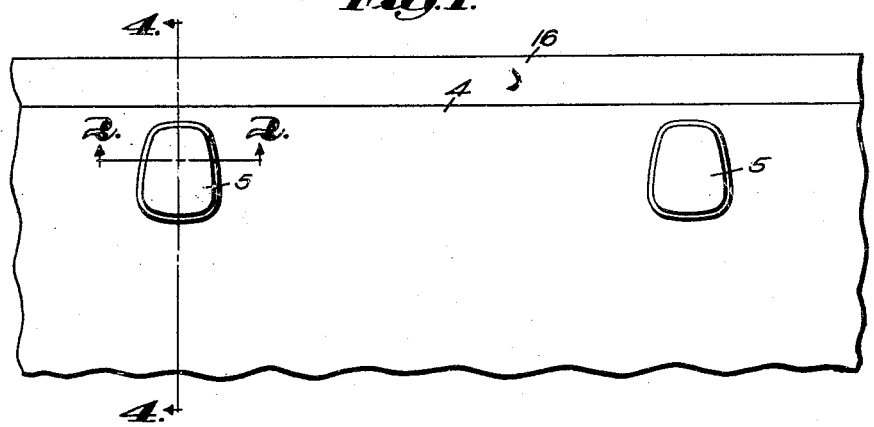
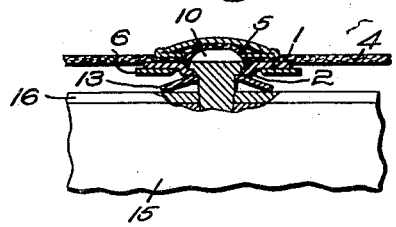
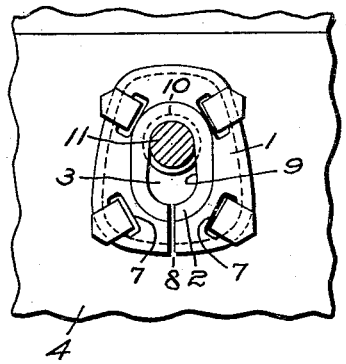
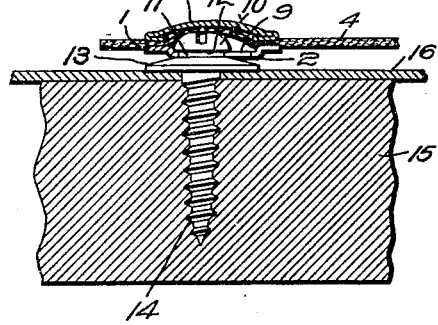
Inventor:
Clifford Towner
by Emery, Booth, Janney & Varney
Attys Patented Feb. 3, 1931

1,791,472

UNITED STATES PATENT OFFICE

CLIFFORD TOWNER, OF WINCHESTER, MASSACHUSETTS, ASSIGNOR TO UNITED-CARR FASTENER CORPORATION, OF CAMBRIDGE, MASSACHUSETTS, A CORPORATION OF MASSACHUSETTS

SEPARABLE FASTENER

Application filed July 24, 1928. Serial No. 295,021.

My invention aims to provide improvements in separable fasteners.

In the drawings which illustrate a preferred embodiment of my invention:—

Figure 1 illustrates the use of my fasteners for securing slip covers and shows a plan view of a portion of a cushion back and two fasteners holding the upper edge of a slip cover in place;

Fig. 2 is a section taken on the line 2—2 of Fig. 1;

Fig. 3 is an under side view of the socket, with the stud head and neck shown in locked position; and Fig. 4 is a section taken on the line 4—4 of Fig. 1, the stud being shown in elevation.

Referring now to the drawings I have illustrated a simple and efficient fastening means particularly, though not exclusively, adapted for use in connection with securing slip covers to the back cushions of vehicle seats. For this type of work it is desirable to use fastening means which may be readily separated and which will hold the slip cover in place under lateral stresses exerted when a person sits down on the seat. Therefore, I have provided stud and socket means which, when engaged, cannot be separated by lateral stresses.

The socket means includes a stud-engaging part 1 pressed from sheet metal and having a boss portion 2 pressed out of the center portion with a stud-receiving aperture 3 substantially keyhole shaped formed in the bottom of the boss portion. The stud-engaging part 1 is shown (Figs. 2 and 4) as secured to the under side of a slip cover 4 by means of an attaching plate 5. Prongs 6 extend from the attaching plate 5 through the slip cover and through apertures 7 in the stud-engaging part 1 and are bent outwardly against the face of the stud-engaging part, as best illustrated in Fig. 3. The stud-engaging part 1 is severed by a slit 8 (Fig. 3), which extends from the enlarged end 9 of the aperture 3 to the outer periphery of the stud-engaging part, to permit slight lateral yielding thereof for purposes hereinafter described. The apertures 7 are larger than the cross-sectional area of the prongs 6 to permit the lateral yielding of the stud-engaging part.

The stud member may be of any suitable construction, but I have illustrated a stud having a thin head 10 a neck 11, an abrupt shoulder 12 between the head and neck, a base 13 and an attaching screw 14. The stud is preferably secured to the frame 15 of the back cushion structure 16 at the top edge, as shown in Figs. 1 and 4. As shown in Fig. 3, the head 10 of the stud is slightly larger in cross-sectional area than the cross-sectional area of the enlarged end 9 of the aperture 3. The neck is about the size of the smaller end of the aperture. The base 13 of the stud may be made by the use of the separate washer, as shown in Fig. 2, to reduce the diameter of the stock from which the stud is made.

In securing the slip cover 4 in position, the heads 10 of the studs are snapped through the enlarged portions 9 of the apertures 3 and then the slip cover is pulled laterally to move the sockets relative to the studs so that they assume the positions shown in Figs. 3 and 4. The slip cover is then drawn tightly over the cushion structure and the other edges secured in any suitable manner. While the fastener elements are secured in the positions as indicated by Figs. 3 and 4, they cannot be separated and therefore the sockets must be shifted laterally relative to the studs to bring the heads adjacent the enlarged portions 9 of the apertures before the slip cover can be removed.

If the slip cover stretches and becomes somewhat loose the fastener elements cannot be separated accidentally because there must be a decided lifting of the socket relative to the stud to expand the stud-receiving part before the socket can be removed from the head of the stud.

While I have illustrated and described my invention, I do not wish to be limited to the particular disclosure and description of use, as the scope of my invention is best defined in the following claims.

I claim:

1. A separable fastener comprising, in combination, a stud having a head, a neck and a shoulder located between said head and said neck, a cooperating socket having a stud-engaging part for engagement back of said shoulder on said stud, said stud-engaging part having an elongated stud-receiving aperture larger at one end than at the other, and said stud-engaging part being severed by a slit extending from the larger end of said stud-receiving aperture to the edge of said part thereby to permit lateral expansion of said part, said stud head being larger in diameter than the largest portion of said stud-receiving aperture so that the head of the stud must be snapped through said aperture, and said stud, when engaged with the socket, having its neck located at the smaller end of said aperture thereby locking the stud and socket against separation except by relative movement of the fastener parts to move the neck to the larger end of the stud-receiving aperture.

2. A separable fastener comprising, in combination, a stud having a head, a neck and an abrupt shoulder located between said head and said neck, a cooperating socket having a stud-engaging part for engagement back of said shoulder on said stud, said stud-engaging part having an elongated stud-receiving aperture larger at one end than at the other, a dished portion adjacent to said aperture to space the wall around the aperture away from a socket-carrying medium, said stud-engaging part being severed by a slit extending from the larger end of said stud-receiving aperture to the edge of said part thereby to permit lateral expansion of said part, said stud head being larger in diameter than the largest portion of said stud-receiving aperture so that the head of the stud must be snapped through said aperture, and said stud, when engaged with the socket, having its neck located at the smaller end of said aperture thereby locking the stud and socket against separation except by relative movement of the fastener parts to move the neck to the larger end of the stud-receiving aperture.

3. A separable fastener socket comprising a stud-engaging part located at one side of a carrying medium, an attaching part at the opposite side of the carrying medium, attaching means extending from one of said parts through the carrying medium and engaging the other part, means providing an elongated stud-receiving aperture enlarged at one end to receive the head of a stud and elongated to permit lateral movement of the socket relative to the stud for locking the stud and socket against accidental separation, and said stud-engaging part being split adjacent to said enlarged portion of said aperture to provide resiliency to the stud-engaging part whereby a head of the stud may be snapped through the enlarged portion of the aperture.

4. A separable fastener socket comprising a stud-engaging part located at one side of a carrying medium, an attaching part at the opposite side of the carrying medium, attaching means extending from one of said parts through the carrying medium and engaging the other part, a boss portion formed on the stud-engaging part, a keyhole shaped stud-receiving aperture in the bottom of said boss portion, and a slit in said stud-engaging part extending from the edge of the enlarged portion of said stud-receiving aperture to the periphery of said stud-engaging part to permit expansion of said stud-receiving part and enlargement of the enlarged portion of stud-receiving aperture whereby the head of a stud may be snapped therethrough, said aperture being elongated to permit lateral movement of the socket relative to the stud for locking the stud and socket against accidental separation.

5. A stud-engaging part for a fastener socket comprising a plate 1 having an elongated stud-receiving aperture 3 having an enlarged portion 9 at one end and a slit 8 in the plate 1 adjacent to the enlarged portion 9 of the aperture 3, said slit permitting slight lateral yielding of the plate 1 for passage of the head of a stud past the wall surrounding the enlarged portion of said aperture, said aperture being elongated to permit lateral movement of the socket relative to the stud for locking the stud and socket against accidental separation.

In testimony whereof, I have signed my name to this specification.

CLIFFORD TOWNER.